United States Patent [19]

Miller et al.

[11] 4,126,360

[45] Nov. 21, 1978

[54] FRANCIS-TYPE HYDRAULIC MACHINE

[75] Inventors: Helmut Miller, Niederrohrdorf, Switzerland; Kurt Baumann, Kressbronn, Germany

[73] Assignee: Escher Wyss Limited, Zurich, Switzerland

[21] Appl. No.: 744,251

[22] Filed: Nov. 23, 1976

[30] Foreign Application Priority Data

Dec. 2, 1975 [CH] Switzerland ................. 15612/75

[51] Int. Cl.² .................. F16C 35/00; H02K 7/08; F03B 11/06
[52] U.S. Cl. ................................. 308/9; 308/73; 310/90; 415/170 R; 415/500; 416/244 A
[58] Field of Search ............... 308/9, 72, 73, 36.3, 308/160, 170, DIG. 15; 310/90; 416/174, 244 A; 415/500, 170 R, 170 A; 290/52

[56] References Cited

U.S. PATENT DOCUMENTS

| 3,004,804 | 10/1961 | Pinkus et al. | 308/73 |
| 3,370,828 | 2/1968 | Willi | 415/500 X |
| 3,453,032 | 7/1969 | Oberle | 308/9 |
| 3,516,757 | 6/1970 | Baumann | 415/170 R |
| 3,610,711 | 10/1971 | Mierley, Sr. | 308/73 |
| 3,752,542 | 8/1973 | Kraus | 308/9 |
| 3,802,044 | 4/1974 | Spillman et al. | 29/113 AD |
| 3,909,080 | 9/1975 | Hällnor et al. | 308/9 |
| 3,994,367 | 11/1976 | Christ | 308/72 X |

Primary Examiner—Robert B. Reeves
Assistant Examiner—Edward M. Wacyra
Attorney, Agent, or Firm—Robert A. Ostmann

[57] ABSTRACT

The disclosure concerns a Francis-type hydraulic machine, i.e., a turbine, pump-turbine or pump, having a bladed wheel of large diameter, and in which bearing apparatus for supporting the rotor is arranged in a peripheral region of the bladed wheel spaced radially from the axis.

8 Claims, 6 Drawing Figures

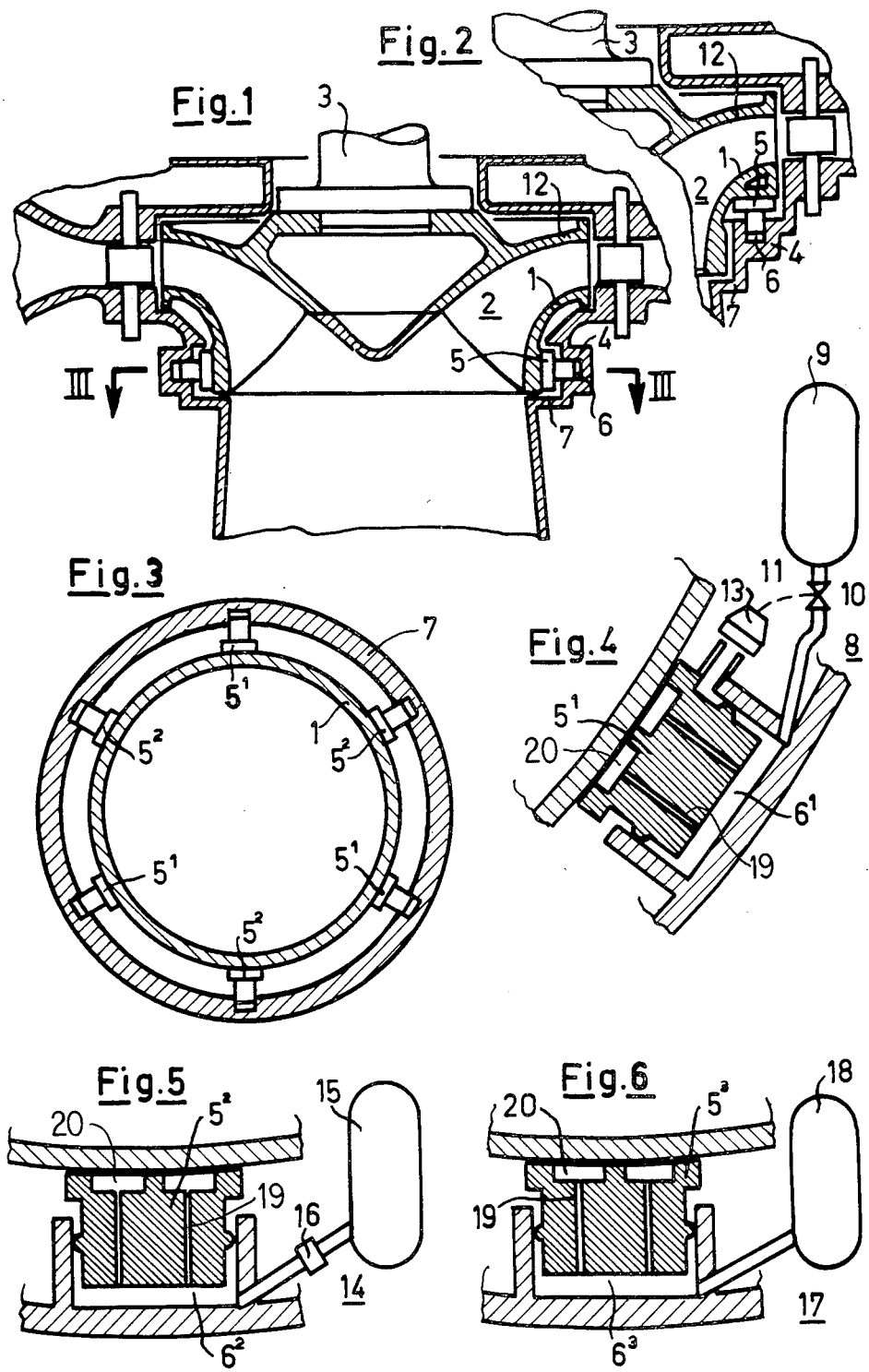

FRANCIS-TYPE HYDRAULIC MACHINE

BACKGROUND AND SUMMARY OF THE INVENTION

The invention relates to Francis-type hydraulic machines (i.e., turbines, pump-turbines and pumps) which employ rotors of large diameter.

In known machines of this kind, the rotor consists of a bladed wheel, such as an impeller or runner, and a shaft, and the shaft is mounted on the machine foundation. In installations where bladed wheels of very large diameter are used, it is difficult to center the rotor reliably and to mount it so as to be free from vibrations.

The object of this invention is to provide an improved Francis-type hydraulic machine in which the rotor is mounted in a reliable and satisfactory manner, even in cases where the bladed wheel has a large diameter. According to the invention, this object is achieved by providing bearing apparatus for the rotor which is arranged in a peripheral region of the bladed wheel spaced radially from the axis. Preferably, the bearing apparatus includes an annular surface carried by the bladed wheel, and cooperating bearing shoes which are mounted on the machine foundation by means of servomechanisms which serve to adjust the shoes relatively to said surface.

BRIEF DESCRIPTION OF THE DRAWING

Several embodiments of the invention are described herein in detail with reference to the accompanying drawing, which contains simplified schematic illustrations, and in which:

FIG. 1 is a vertical, axial sectional view through a Francis turbine incorporating the invention.

FIG. 2 is a fragmentary, vertical, axial sectional view through another Francis turbine incorporating the invention.

FIG. 3 is a sectional view taken on line III—III of FIG. 1.

FIGS. 4–6 are enlarged sectional views of various types of bearing apparatus which may be employed by the invention.

DESCRIPTION OF ILLUSTRATED EMBODIMENTS

Each of the illustrated Francis turbines comprises a bladed wheel 2 which is mounted on a shaft 3 and drives an electrical machine (not shown). At a peripheral region spaced radially from the axis, i.e. at external rim 1, each of the wheels 2 is supported on the foundation of the turbine by a bearing apparatus 4. Apparatus 4 is constructed as a radial bearing in FIG. 1 and as an axial bearing in FIG. 2, but it will be understood that both kinds of bearing may be employed in the same hydraulic machine. In any case, each bearing apparatus 4 includes an annular surface on rim 1 and a plurality of cooperating bearing shoes 5 which are mounted in the wall 7 of the wheel housing by means of servomechanisms 6. These devices 6 serve to adjust shoes 5 relatively to the associated annular surface.

Various types of bearing shoes may be employed in the invention. FIG. 4 shows a shoe $5^1$ which serves as a centering bearing. In this case, the servomechanism includes an apparatus 8 which increases and decreases the pressure in its pressure chamber as the latter contracts and expands, respectively, and which, as a result, causes shoe $5^1$ to supply an increasing reaction as it is displaced away from wheel 2 (i.e., as it is moved in a direction opposite to its supporting direction). Apparatus 8 comprises a source 9 of pressure medium at constant pressure which is connected with the pressure chamber of servomechanism $6^1$ by a conduit 11 containing a valve 10. A control element 13 measures the compression of the servomechanism (that is, the displacement of shoe $5^1$) and operates valve 10 as required to produce the pressure changes mentioned above. Constructional examples of centering bearings of this kind are described in detail in U.S. application Ser. No. 744,252, filed concurrently herewith, and in U.S. Pat. No. 3,994,367 issued Nov. 30, 1976.

FIG. 5 depicts a shoe $5^2$ which serves as a floating damping bearing. With this kind of bearing shoe, the servomechansim $6^2$ includes an apparatus 14 which maintains a constant pressure in the pressure chamber during slow movements of shoe $5^2$, but increases the pressure in that chamber when the shoe is suddenly displaced in a direction opposite to its supporting direction. The effect, of course, is to increase the bearing reaction supplied by shoe $5^2$ when the latter is rapidly loaded. The apparatus 14 which produces this result includes a source 15 of pressure medium at constant pressure which is connected with the pressure chamber of servomechanism $6^2$ via a conduit containing a throttling element 16. Examples of this kind of bearing are described in detail in U.S. application Ser. No. 744,319 filed concurrently herewith.

A third kind of bearing shoe $5^3$ is shown in FIG. 6. This shoe serves as a floating bearing, and its servomechanism $6^3$ includes an apparatus 17 which keeps the pressure in the pressure chamber, and consequently the bearing reaction, constant regardless of displacement of bearing shoe $5^3$. Apparatus 17 includes a source 18 of pressure medium at constant pressure which is connected directly with the pressure chamber of servomechanism $6^3$. Examples of bearings of this type are described in U.S. Pat. No. 3,802,044, granted Apr. 9, 1974.

Regardless of its function, each of the bearing shoes 5 includes throttling ducts 19 which lead from the pressure chamber of the associated servomechanism to pockets 20, which are formed in the bearing face of the shoe and are used for hydrostatic support of the cooperating annular surface on wheel 2. Moreover, a portion of each bearing shoe serves as the piston of the associated servomechanism and is arranged so that it may pivot relatively to the cooperating cylinder. Therefore, the shoes are free to pivot relatively to the machine foundation.

As shown in FIG. 3, bearing apparatus 4 employs three of the centering bearing shoes $5^1$, and these shoes are distributed uniformly around the circumference of rim 1. The apparatus also includes three floating damping shoes $5^2$, one being situated diametrically opposite each centering shoe $5^1$. The shoes $5^1$ insure precise centering of external rim 1, and consequently also precise centering of the bladed wheel 2 of the hydraulic machine. The floating damping shoes $5^2$, on the other hand, take up radial shocks which occur, for example, during starting or stopping of the machine.

In installations where the axis of bladed wheel 2 is not vertical, apparatus 4 may employ floating shoes $5^3$ to sustain part or all of the weight of bladed wheel 2. These shoes, of course, would be arranged to act in upward directions.

Although, in each of the illustrated embodiments, the bearing apparatus 4 is located at the downstream end of external rim 1, it could be situated at the region of the largest diameter of wheel 2 (i.e., at the upstream end of rim 1) or at the outer periphery of hub disc 12.

We claim:

1. In a Francis-type hydraulic machine having a rotor which includes a bladed wheel of large diameter, the improvement which comprises bearing apparatus for supporting the rotor which is arranged in a peripheral region of the bladed wheel spaced radially from the axis and which includes
   a. an annular surface carried by the bladed wheel;
   b. a plurality of circumferentially spaced bearing shoes mounted in a foundation of the machine and cooperating with the annular surface; and
   c. a hydraulic servomechanism for each bearing shoe which serves to adjust the shoe relatively to the annular surface.

2. A machine as defined in claim 1 in which the bearing apparatus is a radial bearing arrangement.

3. A machine as defined in claim 1 in which the bearing apparatus is an axial bearing arrangement.

4. A machine as defined in claim 1 in which
   a. there are at least three equispaced shoes which serve as centering bearings; and
   b. the servomechanism associated with each of these centering bearings includes a pressure chamber which expands as the associated shoe is displaced in its supporting direction and contracts as the shoe is displaced in the opposite sense, and means for decreasing and increasing the pressure in the pressure chamber when the latter is expanded and contracted, respectively,
   c. whereby the bearing reaction of the shoe is correspondingly decreased and increased, respectively.

5. A machine as defined in claim 1 in which
   a. there are at least three equispaced shoes which serve as floating damping bearings; and
   b. the servomechanism associated with each of these floating damping bearings includes a pressure chamber which expands as the associated shoe is displaced in its supporting direction and contracts as the shoe is displaced in the opposite sense, and means for maintaining a constant pressure in the pressure chamber when the chamber expands and contracts slowly and for increasing the pressure in the pressure chamber when the chamber is contracted suddenly,
   c. whereby the shoe supplies a constant bearing reaction when it is displaced slowly and a greater bearing reaction when it is displaced rapidly in a direction opposite to its supporting direction.

6. A machine as defined in claim 1 in which the bearing shoes are mounted for pivotal movement relatively to the foundation.

7. A machine as defined in claim 6 in which each servomechanism has cooperating piston and cylinder elements which can pivot with respect to each other; and the associated bearing shoe is carried by one of those elements.

8. A machine as defined in claim 1 in which
   a. there is at least one bearing shoe which serves as a floating bearing and is arranged to carry at least a part of the weight of the rotor; and
   b. the servomechanism associated with said floating bearing has a pressure chamber which expands and contracts as the associated shoe is displaced in opposite senses, and means for maintaining a constant pressure in the pressure chamber,
   c. whereby the shoe supplies a constant bearing reaction regardless of its displacement.

* * * * *